US010965806B1

(12) United States Patent
Haggerty

(10) Patent No.: US 10,965,806 B1
(45) Date of Patent: Mar. 30, 2021

(54) AUTO-CORRECTING VOICE QUALITY IN REAL-TIME

(71) Applicant: Noble Systems Corporation, Atlanta, GA (US)

(72) Inventor: Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 16/778,770

(22) Filed: Jan. 31, 2020

(51) Int. Cl.
*H04M 1/64* (2006.01)
*H04M 3/22* (2006.01)
*G06N 3/08* (2006.01)
*G06N 3/04* (2006.01)
*H04M 3/493* (2006.01)

(52) U.S. Cl.
CPC ............ *H04M 3/2236* (2013.01); *G06N 3/04* (2013.01); *G06N 3/08* (2013.01); *H04M 3/493* (2013.01)

(58) Field of Classification Search
CPC ...... H04M 3/2236; H04M 3/493; G06N 3/04; G06N 3/08
See application file for complete search history.

(56) References Cited

U.S. PATENT DOCUMENTS

| | | | |
|---|---|---|---|
| 7,831,025 B1 * | 11/2010 | Francis | H04M 3/2236 379/1.01 |
| 8,195,449 B2 | 6/2012 | Bruhn et al. | |
| 8,964,572 B2 | 2/2015 | Baykal et al. | |
| 9,641,681 B2 | 5/2017 | Nuta et al. | |
| 9,679,555 B2 | 6/2017 | Sen et al. | |
| 10,091,348 B1 | 10/2018 | Arunachalam et al. | |
| 2008/0175228 A1 * | 7/2008 | Chang | H04L 65/1056 370/352 |
| 2014/0226799 A1 * | 8/2014 | Aggarwal | H04L 43/50 379/32.01 |
| 2015/0142702 A1 | 5/2015 | Nilsson et al. | |
| 2015/0237552 A1 * | 8/2015 | White | H04W 36/08 370/331 |
| 2015/0317977 A1 * | 11/2015 | Manjunath | G10L 25/48 704/270 |

(Continued)

OTHER PUBLICATIONS

Multi-Label Image Classification with Neural Network, https://towardsdatascience.com/multi-label-image-classification-with-neural-network-keras-ddc1ab1afede, Shiva Verma, Sep. 30, 2019.

(Continued)

*Primary Examiner* — Simon King

(57) ABSTRACT

Various embodiments of the invention provide methods, systems, and computer program products for handling poor voice quality being experienced by a remote party on a call. In various embodiments, an assessment is received from the party at an IVR on the voice quality of the call. Accordingly, data is collected for one or more parameters associated with at least one of audio of the call and a network used to carry the audio of the call in response to the party experiencing poor voice quality. At this point, a predictive model is used to predict at least one cause for the poor voice quality. Here, the data collected for the one or more parameters is provided as input to the predictive model. Accordingly, one or more actions are taken to attempt to address the at least one cause and improve the voice quality on the call for the remote party.

18 Claims, 6 Drawing Sheets

(56) References Cited

U.S. PATENT DOCUMENTS

| | | | |
|---|---|---|---|
| 2016/0360436 A1* | 12/2016 | Zhang | H04W 8/22 |
| 2017/0094052 A1* | 3/2017 | Zhang | H04M 3/2227 |
| 2018/0365581 A1 | 12/2018 | Vasseur et al. | |
| 2020/0022007 A1* | 1/2020 | Ouyang | G10L 15/22 |
| 2020/0127901 A1* | 4/2020 | Hariharan | H04B 17/336 |
| 2020/0128446 A1* | 4/2020 | Singh | H04W 24/00 |
| 2020/0145304 A1* | 5/2020 | Wulff | H04L 67/22 |

OTHER PUBLICATIONS

SNOM White Paper on Voice Quality, https://www.electronicfrontier.co.uk/wp-content/uploads/2015/12/Voice-Quality_Snom_Whte-Paper_2015-08-06-Approved-Content.pdf, Aug. 6, 2015.

* cited by examiner

AUTO-CORRECTING VOICE QUALITY IN REAL-TIME

BACKGROUND

Although in today's World contact centers make use of a number of different channels of communication, voice calls still remain a popular channel for both inbound and outbound contact center traffic. Today, Voice over Internet Protocol ("VoIP") is quickly becoming a communication technology used by many contact centers. VoIP offers a number of benefits for contact centers. For instance, VoIP provides contact centers with capabilities to deliver services across multiple channels of communication such as voice, fax, email, instant messaging, text messaging, Web, images, and video. In addition, VoIP allows contact centers to take advantage of open computing architecture resulting in reduced costs and improved flexibility.

However with that said, there are common voice quality problems associated with VoIP telecommunication services in IP packet networks such as noise, packet loss, and echo. Delayed delivery of audio (e.g., audio data) for a voice call (known as latency) can lead to bad echo and the parties interrupting each other during the call. While variations in delay of audio delivery, known as jitter, can cause strange sound effects on the call. Further, packet loss caused by network congestion or failure can cause interruptions in the call that are not typically recoverable. In fact, even one percent audio loss can significantly degrade a call.

Accordingly, persons who are on a call with a contact center expect a high-quality call experience. To meet such expectations, contact centers are often required to define, monitor, measure, analyze, and improve call quality. To accomplish this goal, contact centers may use various methods for objectively assessing call quality. For instance, the simplest methods use basic engineering metrics such as signal-to-noise ratio. However, call quality can be considerably subjective. That is to say, what one person may consider acceptable quality may not be acceptable for another person. Therefore, these basic engineering metrics may be modified in some instances to attempt to take into account a human's perceived quality.

Furthermore, more advanced methods may be used for assessing call quality in an attempt to mimic human hearing so as to better account for human perceived quality. For example, the Mean Opinion Score ("MOS") has been developed as a measure of human perceived quality. MOS is based on the ITU-T P.800 recommendation and requires that relatively large numbers of human listeners rate voice quality as part of a controlled and well-defined test process. The advantage of the MOS process is that clarity evaluations are derived directly from the individuals who experience a call. However, MOS evaluations are typically quite expensive, can be difficult to repeat when new telephony capabilities need to be tested, and are time consuming. For these reasons, those in the industry have developed processes based on predictive models to provide more objective and repeatable results.

For instance, U.S. Pat. No. 9,558,451 entitled "Adapting Parameters of a Call in Progress with a Model That Predicts Call Quality" ('451 Patent). This patent describes a predictive model that takes user feedback scores from real calls, models these in relation to objective technical parameters of the calls, and then dynamically outputs the results back into the model to adapt further calls. The use of the results is said to be dynamic in that the use goes on automatically "in the field," once the model has been deployed in live operation. Here, the model receives technical parameters of a call currently being conducted, and in response issues information used to automatically adapt the call while it is still ongoing.

Specifically, the model obtains respective measurements of the technical parameters and uses the measurements as inputs to provide a predicted opinion score for the current call. If the predicted opinion score is below a threshold or is categorized as "bad," then an adaptation involving adapting one or more of the parameters is determined based on the predicted opinion score. For example, it may be determined that for a given bit rate achievable over the network, a better quality of user experience can be achieved during a call video by trading off frame rate for frame resolution or vice versa. If so, then an increase and decrease of these parameters respectively, or target values of these, are made while the call is ongoing. There are a number of ways the model may be implemented to determine the adjustment or target values for the technical parameters.

For instance, the model may examine neighboring cells or cells within a predetermined distance in the feature space of the cell describing the current call, to check whether any would give a higher predicted score. That is to say, in effect the model looks at alternative candidate vales of the call's technical parameters where the candidate values extend within a certain range of the current values in one or more directions of the multidimensional quantized feature space. If the model finds any values that would increase the predicted score, then a corresponding adjustment is made.

Another possibility is to try a random selection of alternative, candidate parameter values to check whether any would give a better score. This approach can be characterized as a "trial-and-error" process in an attempt to identify adjustments to one or more technical parameters that can lead to a higher predicted score for the call. While another alternative is to implement an analytical or empirically determined algorithm to determine the path or jump to a higher score from any given point in the feature space. However, such approaches can be viewed as a disadvantage to the model described in the '451 Patent because these approaches required the model to take additional actions outside of predicting an opinion score for the call to attempt to improve the quality of the call while the call is ongoing.

Furthermore, other factors besides the current values of the technical parameters may play a part in the quality of the call such as a party's expectation or mood. For example, parties who may be on a call will have different expectations as to what is a "good" call. Thus, individual opinion scores are noisy due to party bias. Therefore, while the process described in the '451 Patent may give a higher experienced call quality on average across a group of individuals, predicting individual party opinion scores from technical parameters alone may not always be as accurate as may be desired for any one individual party. The model attempts to address this disadvantage in the '451 Patent by adding one or more parameters directed to characteristics of a party such as country or geographic region where the party is located, the party's age, the length of time the party has participated in a communication system, and/or the amount of prior feedback provided by the party. However, such parameters still do not account for a party's bias (subjective views) in many instances.

Thus, a need in the art exists for evaluating the quality of a call in real-time that takes into consideration the party's actual subjective view of the call quality. In addition, a need in the art exists for determining what parameters associated with the call should be adjusted during the call to improve the quality of the call. It is with respect to these considerations and others that the disclosure herein is presented.

BRIEF SUMMARY

In general, embodiments of the present invention provide computer program products, methods, systems, apparatus, and computing entities for handling poor voice quality being experienced by a remote party on a call. In various embodiments, an assessment is received from the remote party at an interactive voice response system (IVR) on the voice quality of the call. Accordingly, data is collected for one or more parameters associated with at least one of audio of the call and a network used to carry the audio of the call in response to the assessment indicating the party is experiencing poor voice quality. The data is collected for these particular parameters because the parameters are known to affect the voice quality of the call.

At this point, a predictive model is used in various embodiments to predict at least one cause for the voice quality being poor. For instance, in particular embodiments, the predictive model is a neural network. Here, the data collected for the one or more parameters is provided as input to the predictive model. In addition, the IVR may receive information from the party on the party's opinion of the voice quality of the call and this information may also be provided as input to the predictive model. Accordingly, one or more actions are then taken to attempt to address the identified cause and improve the voice quality on the call for the remote party.

In particular embodiments, the IVR may also communicate to the party that the one or more actions have been taken to attempt to address the identified cause once the one or more actions have been taken. In addition, the IVR may receive a second assessment from the remote party on the voice quality of the call. If the party is continuing to experience poor voice quality, then new data may be collected for the one or more parameters and another prediction of a second cause for the poor voice quality may be made using the predictive model with the new data for the one or more parameters provided as input. If for some reason a determination is made that no actions can be taken to attempt to address the second cause, then the IVR may communicate to the party that no action can be taken to attempt to improve the voice quality on the call. In particular instances, the party may be instructed to hang up and try to call at a later time. Further, the party may also be provided with information that the party can use to gain priority on a subsequent call over at least one other call.

The subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high-level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
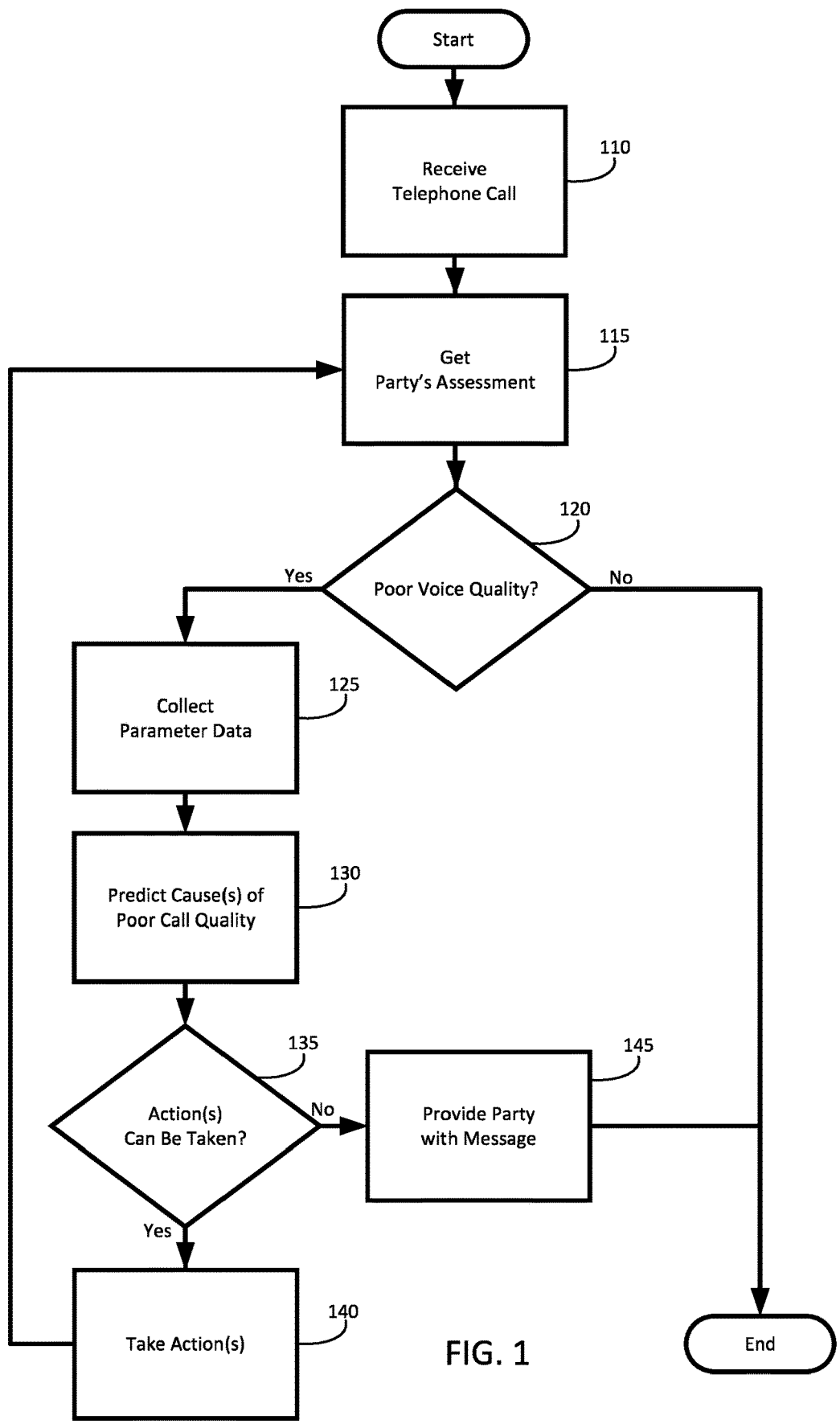
FIG. 1 illustrates a process overview demonstrating different aspects of various embodiments of the invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

The embodiments of the invention are discussed herein in the context of a contact center environment. However, those of ordinary skill in the art can readily appreciate the applicability of various embodiments of the invention in other environments such as, for example, hospitals, government agencies, or entities providing emergency and/or hotline services. Thus, the scope of the invention is not intended to be limited to use in a contact center environment and should not be construed as so.

Process Overview

FIG. 1 provides a process overview in accordance with various embodiments of the invention for auto-correcting the voice quality of a telephone call in real-time. This overview is provided as an example to help the reader's understanding of various embodiments of the invention. However, the process overview provided in FIG. 1 does not encompass all embodiments of the invention as contemplated by the inventor. For instance, the process overview shown in FIG. 1 is discussed with respect to the use of various embodiments of the invention in a contact center context. However, embodiments of the invention may be used outside the contact center environment and in general, in any environment in which the voice quality of a call may need to be evaluated and corrected. Therefore, the process overview provided in FIG. 1 should not be construed to limit the scope of the invention.

The process generally begins with the contact center receiving a telephone call that involves a party on the call at Step 110. Depending on the circumstances, the call may be an outbound call placed by the contact center to the party or inbound call received by the contact center from the party. At this point, the call is forwarded to an Interactive Voice Response system ("IVR") in particular embodiments so that the party can provide an assessment of the voice quality he or she is currently experiencing on the call in Step 115.

For example, the IVR may ask the party to rate the voice quality the party is currently experiencing on the call by providing a rating from one to five, with five being excellent voice quality and one being very poor voice quality. While in other instances, the IVR may simply ask the party whether the voice quality the party is currently experience on the call is poor and/or unacceptable. Accordingly, the party may answer by either providing the answer by speaking or entering one or more dual-tone multiple frequency ("DMTF") tones. In addition, the IVR may inquire about additional information that may be helpful in assessing the current voice quality of the call such as whether the party is using a mobile device or a landline phone, who is the party's telco provider, and/or whether the volume of the call is too loud or too soft for the party.

In other instances, the call may be forwarded to an agent instead of an IVR who then asks about the voice quality the party is currently experiencing on the call. In these instances, the agent may also provide input as to the voice quality he or she is currently experiencing on the call. Again, the agent may further interact with the party to gather additional information that may be helpful in evaluating the current voice quality of the call.

The process then continues with a determination being made as to whether or not poor voice quality is currently being experienced on the call in Step 120. If not, then the call is treated with conventional processing normally experienced in contact centers. For example, the call may then be connected with an agent to speak with if the call was initially forwarded to an IVR.

However, if the voice quality is poor, then data (e.g., the current values) for several parameters associated with the call are collected in Step 125. Here, depending on the embodiment, the parameters may encompass parameters associated with different aspects of the call. For instance, one or more of the parameters may be associated with the audio characteristics/properties of the call (audio parameters). For example, measurements of audio parameters such as frequency, pitch, speaker change rate, echo, and/or noise may be taken. In addition, one or more of the parameters may be associated with the network over which the audio of the call is carried (network parameters). For example, when VoIP technology is being used, measurements of network parameters such as delay, various packet properties such as packet count, packet duplication, and packet loss, and bit rate may be taken.

Once the data for the parameters have been taken, the data is then provided as input in various embodiments to one or more predictive models to predict cause(s) of the poor voice quality in Step 130. Generally speaking, predictive modeling (machine learning) is concerned with the construction and study of systems (e.g., computers) that can learn from data and then predict based on learned behavior. The core of predictive modeling deals with representation and generalization. That is to say, a core objective of a predictive model is to generalize from its experience. Generalization is the ability of the predictive model to perform accurately on new, unseen instances after having experienced a training dataset comprising instances with known outcomes. Thus, a predictive model focuses on providing predictions based on known properties learned from a training dataset.

Several types of predictive models exist and may be applicable with respect to embodiments of the invention. For instance, a decision tree uses a tree-like graph or model of decisions (flowchart-like structure) to map observations about an item to conclusions about the item's target value. In general, the flowchart-like structure is made up of internal nodes representing tests on attributes and branches flowing from the nodes representing outcomes to these tests. The internal nodes and branches eventually lead to leaf nodes representing class labels. Accordingly, a path from a root to a leaf represents classification rules.

Another type of predictive model is a support vector machine (SVM). SVMs are generally a set of related supervised learning methods that can be used for classification purposes. That is to say, SVMs are generally used to classify an instance into one class or another. Given a set of training examples, each marked as belonging to one of two categories (e.g., classes), an SVM training algorithm builds a model that predicts whether a new sample falls into one of the two categories.

There are countless other types of predictive models, such as Bayesian networks, clustering, and reinforcement learning to name a few, that one of ordinary skill in the art may make use of with respect to various embodiments of the invention. However, with respect to the embodiments of the invention described herein, the type of predictive model utilized is a neural network.

An artificial neural network is a learning algorithm inspired by the structure and functional aspects of biological neural networks. Computations are structured in terms of an interconnected group of artificial neurons, processing information using a connectionist approach to computation. Artificial neural networks are typically used to model complex relationships between inputs and outputs to find patterns in data or to capture a statistical structure in an unknown joint probability distribution between observed variables.

As discussed in further detail herein, one or more predictive models are constructed to attempt to (predict) identify one or more cause(s) of the poor voice quality on the call. In particular embodiments, information gathered from the party on the call (as well as the agent in some instances) may also be provided as inputs to the model(s) along with the data collected for the parameters associated with the call. Accordingly, the inputs to the model(s) for these particular embodiments may include both subjective and objective parameters. These subjective parameters are gathered directly from the party (and agent in some instances) on the call and as a result, address any bias that may be introduced by the party (and agent) with respect to what voice quality is being experienced on the call.

In addition, the predictive model(s) provide a prediction of the cause(s) of the poor voice quality as opposed to a prediction of the voice quality itself. Since the process involves surveying the party (and agent in some instances) on the call about the voice quality being experienced, a prediction as to whether the voice quality is poor is not needed. Here, if the party indicates he or she is happy with the voice quality, then no further actions need to be taken with respect to call. Only in instances where the party (and agent) indicates he or she is experiencing poor voice quality does the process need to continue to attempt to address the poor voice quality.

Once the predictive model(s) have predicted one or more causes of the poor voice quality, the process continues with determining whether any actions can be taken with respect to the call to attempt to improve the voice quality for the call in Step 135. For example, the predictive model(s) may indicate that the cause of the poor voice quality the party is experiencing on the call is because the party is experiencing a high level of echo on the call. Echo results from the sound of a talker's voice returning to the talker's ear. Although echo does not necessarily influence sound quality, echo can significantly affect a talker's perception of sound quality. In many instances, an echo suppressor can be used to combat echo. Generally speaking, an echo suppressor introduces echo cancellation by detecting a voice signal going in one direction on a circuit and inserting loss in the other direction. Here, the settings of the echo suppressor may be adjusted to better cancel the party's voice returning to the party on the audio channel leading from the contact center to the party.

If one or more actions can be taken to attempt to address the poor voice quality, then the actions are taken in Step 140. At this point, the process may involve returning to Step 120 and interacting with the party on the call to inquire as to whether the voice quality has improved. If the voice quality has improved to the point that the party is happy with the quality he or she is experiencing, then the call is handled using conventional processing normally experienced in contact centers. However, if the quality is still unacceptable, then the process may be repeated in attempt to remedy the continued poor voice quality.

At some point, a determination may be made that no further actions are available to attempt to improve the voice quality on the call. For instance, the predictive model(s) may indicate the cause of continued poor voice quality is the same cause as previously predicted and all the actions known to address the cause may have already been performed. While in another instance, the predictive model(s) may indicate the cause is something that cannot be addressed by any actions that can be taken by the contact center. For example, the predictive model(s) may predict the cause of the poor voice quality is excessive packet loss being experienced from the telco provider. Here, the cause is due to the telco provider's network, which is out of the control of the contact center. Therefore, the contact center does not have any parameters within its control to adjust to attempt to address the poor voice quality.

Accordingly, such situations are addressed in various embodiments by providing the party with a message indicating the quality of the call cannot be improved further in Step 145. In particular instances, the message may indicate to the party that he or she may want to hang up and try another call at another time. In addition, the party may be provided with information that allows the party to obtain priority when he or she calls back into the contact center. For example, the party may be given a code that he or she can provide to be given priority. In other instances, when the call is being handled by an agent instead of an IVR, then the agent may inform the party the quality cannot be improved and take appropriate action.

Exemplary Contact Center Architecture

Figure 2:
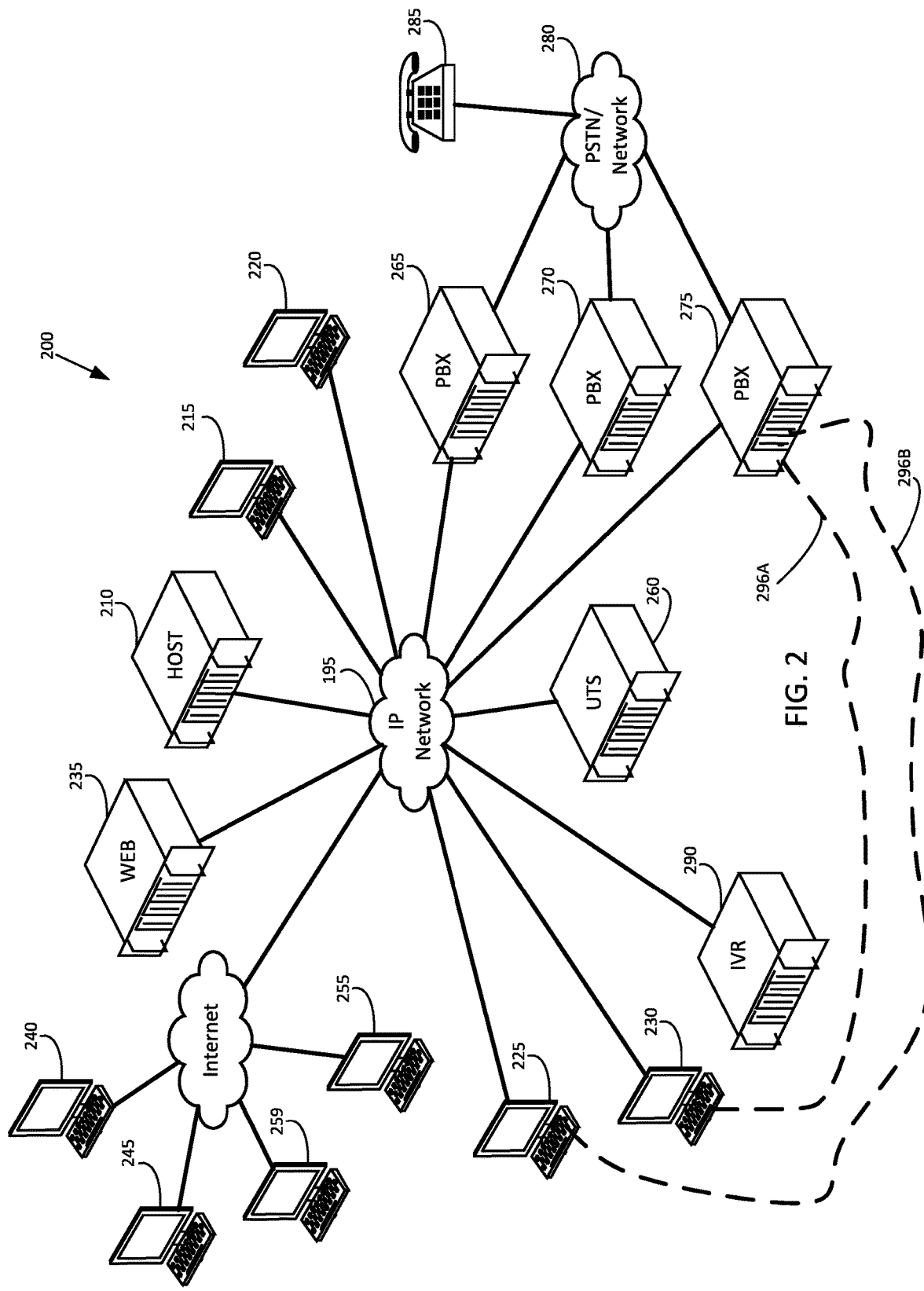
FIG. 2 illustrates a contact center architecture illustrating the technologies disclosed herein accordingly to various embodiments of the invention.

FIG. 2 provides a contact center architecture 200 illustrating the technologies disclosed herein accordingly to various embodiments. Specifically, the contact center architecture 200 is configured in various embodiments to receive calls from and/or originate calls to various parties and depending the embodiment, the architecture 200 may involve transferring the voice audio associated with these calls internally using a number of different technologies such as, for example, voice over internet protocol ("VoIP") and integrated services digital network ("ISDN"). VoIP generally allows the delivery of voice audio for telephone calls over an IP network as the transmission medium by sending voice data in digital packet form using internet protocol while ISDN allows for the delivery of voice audio as a digital transmission over more traditional circuits of the public switched telephone network ("PSTN").

In various embodiments, the architecture 200 includes a host server 210 that controls and handles distribution of calls within the contact center as well as other functions such as, for example, keeping track of, and controlling, agent activity. An agent at the contact center typically makes use of a computing device and telephony device to handle data and voice functionality and the combination of these devices may be referred to as a "workstation." However with that said, in particular instances, the computing device may also act as the telephony device and handle voice functionality via, for example, a soft phone device such as a headset or a virtual telephone implemented in part by an application program executing on the computing device.

Some agents' workstations 215, 220, 225, 230 (e.g., premise-based agents) may be in direct communication with the host server 210 over some type of network 295 such as, for example, a local area network ("LAN") or wide area network ("WAN"), while other agents' workstations 240, 245, 250, 255 (e.g., work-at-home agents) may establish communication with the host server 210 thru an intermediary such as a web server 235 over the Internet. For instance, for a work-at-home agent to establish communication with the host server 210, the agent may enter a particular URL in a browser on his workstation 240, 245, 250, 255 to access a website provided by the web server 235. Once the website has been accessed, the agent may then be required to login (e.g., enter login credentials) to gain access to the host server 210. Once the agent has successfully logged in (e.g., provided valid credentials), the host server 200 establishes a connection to the agent's workstation 240, 245, 250, 255 via the web server 235. As for a premise-based agent, the agent typically just logs in on his workstation 215, 220, 225, 230 and the host server 210 establishes a connection directly to the agent's workstation 215, 220, 225, 230 upon receiving valid credentials.

Once a connection is established between an agent's workstation 215, 220, 225, 230, 240, 245, 250, 255 and the host server 210, requests can be sent back and forth through these connections between the various agent workstations 215, 220, 225, 230, 240, 245, 250, 255 and the host server 210. For example, an agent may need to pause a call the agent is currently handling or transfer the call to another agent and may send a request over the connection to the host server 210 so that the server 210 can receive and process the request. In another example, the host server 210 may send a message to an agent's workstation 215, 220, 225, 230, 240, 245, 250, 255 over the connection to inform the agent that a particular call is being routed to the agent to handle. Furthermore, information that is displayed to agents on their workstations 215, 220, 225, 230, 240, 245, 250, 255 may be provided through these connections.

Continuing on, in various embodiments, the contact center architecture 200 may include a universal telephony server ("UTS") 260 that controls telephony functions and acts as a communications layer between the host server 210 and PSTN and/or other types of networks 280 used by telco providers to transfer telephony traffic. For instance, in particular embodiments, the UTS 260 communicates with the host server 210 via a socket connection and is configured to receive outbound call requests from the host server 210 and send the requests to the PSTN and/or other networks 280. Likewise, the UTS 260 is configured to receive inbound calls from the PSTN and/or other networks 280 and send requests to the host server 210 on how to route these calls. Accordingly, the UTS 260 shown in FIG. 1 interfaces with one or more private branch exchanges ("PBXs") 265, 270, 275 which in turn act as the conduit between the UTS 260 and the PSTN and/or other networks 280. Although PBXs are shown in FIG. 1 for handling the call to/from the PSTN, other forms of switching devices could be used in other embodiments. Depending on the circumstances, the PBXs 265, 270, 275 may contain software and/or hardware necessary to interface with the PSTN and/or other networks 280.

To place an outbound call, the host server 110 sends a dial request to the UTS 260 and the UTS 260 processes the request and sends it to one of the PBXs 265, 270, 275. For instance, in particular embodiments, the dial request may identify the line to use to dial out the call and a dial string. In turn, the appropriate PBX 265, 270, 275 receives the dial request, maps the request to the proper technology type for the request (e.g., selects the appropriate channel driver based on the dial string for the request), and sends the request to the technology it matches. The chosen technology then originates the call out to the telco provider via the PSTN or other network 280, as appropriate, based on the settings for the chosen technology. At this point, the telco provider places the call to the intended party and sends the result of the call (e.g., a connect, no answer, busy signal, disconnected number, etc.) to the PBX 265, 270, 275. The PBX 265, 270, 275 processes the result and sends it to the UTS 260. If the result indicates a no answer, busy signal, or disconnected number, the UTS 260 filters out the call. However, if the result indicates a connect for the call, the UTS 260 informs the host server 210 of the connect. In response, the host server 210 informs the UTS 260 to switch the connected call to an agent's workstation 215, 220, 225, 230, 240, 245, 250, 255 to handle. In addition, the host server 210 sends a connect event to the agent's workstation 215, 220, 225, 230, 240, 245, 250, 255 to inform the agent that a call is being connected to him. Accordingly, the agent begins to converse with the party on the call.

As is discussed in further detail herein, the UTS 260 in various embodiments may initially route the call to an interactive voice response system ("IVR") 290. Here, in particular embodiments, the IVR 290 may interact with the party of the call so that an evaluation of the call quality the party is experiencing can be determined. In turn, the IVR 290 may play voice prompts to solicit information from the party and collect and analyze responses from the party in the form of dual-tone multiple frequency ("DMTF") tones and/or speech. If the party indicates the call quality is "bad," then the UTS 260 may conduct an analysis of the call to determine whether any actions may be taken to attempt to improve the call quality.

In similar fashion, when an inbound call arrives on one of the PBXs 265, 270, 275, the PBX 265, 270, 275 immediately routes the call to the UTS 260 to process. In turn, the UTS 260 may determine whether or not the call should be routed to an IVR 290. If so, the call is routed to the IVR 290 and the caller interacts with the IVR 290. Besides being used to evaluate call quality, the IVR 290 may be used to further identify the purpose of the call, such as, for example, prompting the party to provide account information or otherwise obtain information used to service the call. Furthermore, the IVR 290 may interact with other components within the contact center architecture 200, such as a data store (not shown), to retrieve or provide information for processing the call or provide other functionality within the contact center architecture 100 such as voice mail for agents and/or setting up callbacks to remote parties, although such functionality may be provide via other components.

During an inbound call, if the caller opts to speak with an agent, then the UTS 260 sends a request to the host server 210 asking the server 210 where to route the call. In response, the host server 210 selects an available agent to route the call to, sends a request to the UTS 260 to switch the communication channel being used by the call to the available agent's workstation 215, 220, 225, 230, 240, 245, 250, 255, and sends a connect event to the agent's workstation 215, 220, 225, 230, 240, 245, 250, 255 to inform the agent that a call is being connected to him. At this point, the agent begins to converse with the caller.

With respect to agents, the contact center may make use of various technologies depending on the embodiment to establish audio paths for agents for purposes of providing audio for telephone calls. For example, in particular instances, the contact center may make use of session initiation protocol ("SIP") to establish the audio paths (e.g., VoIP call sessions) over an IP network 295 while actual transfer of the audio over the network 295 is provided using real-time transport protocol ("RTP"). While in other instances, the contact center may make use of ISDN to establish audio paths over traditional synchronous digital circuits 296A, 296B to agents' workstations 225, 230 instead of over an IP network 295. In these instances, the agents' workstations 225, 230 may be connected to the host server 210 over the IP network 295 to provide data functionality, while connected to the PBXs 265, 270, 275 over traditional circuits 296A, 296B to provide audio functionality. Other configurations are possible as those of ordinary skill in the art can contemplate in light of this disclosure.

Continuing on with this in mind, in various embodiments, agents' audio paths are maintained in between calls handled by agents so that a call can be routed to a particular agent by simply "bridging" the call onto the agent's audio path. While such a configuration may not be used in every embodiment, doing so can provide advantages that may not otherwise be realized under other configurations. For instance, maintaining agents' audio paths between calls can help to route calls to agents more effectively and help lower call hold times. Since an active audio path is maintained for an agent, a call can be bridged onto the agent's audio path without the party on the call having to wait for the agent to pick up a ringing phone. The agent is already there and ready to converse with the party. This can be extremely important for outbound calls in which having to have a party remain on hold a few seconds on a call before an agent is present can drastically impact whether such a party remains on the call or hangs up. In addition, from an inbound perspective, the contact center may not want to provide an agent with the opportunity to decide whether or not to answer a call for a few seconds while a party on a call remains waiting. Instead, the agent is automatically connected to a call bridged onto his active audio path under such a configuration unless the agent goes into a pause state.

The remote parties involved in calls may make use of a variety of different telephony devices 285. For instance, a party may receive or place a call using a conventional analog telephone connected to the PSTN 280 using an analog plain old telephone service ("POTS") line and routed using various types of facilities, including, but not limited to: T1 trunks, SONET based fiber optic networks, ATM networks, etc., as well as various types of routers, switches, bridges, gateways, and other types of equipment to process the call. In addition, a party may receive or place a call using a device 285 such as a desktop or laptop computer, a smart phone, mobile phone, tablet, or other mobile device. Depending on the device 285, these calls may be placed or received via a telco provider, an Internet provider, and/or wirelessly via a mobile service provider (all of which can be simply referred to as "service provider").

Finally, it is noted that although a number of the above entities may be referred to as a "server," each may also be referred to in the art as a "computing device," "unit,"

"component," or "system." An entity may incorporate a local data store and/or interface with an external data store. Use of the word "server" does not necessarily require the entity to interact in a formal client-server arrangement with other entities, although that may be the case. Further, the above entities may be located remotely from (or co-located with) other entities. Furthermore, one or more of the entities may be implemented on a single processing device to perform the functions described herein. In addition, the contact center architecture 200 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the entities identified above must be actually located in a contact center location or controlled by a contact center operator. Those skilled in the art will recognize FIG. 1 represents one possible configuration of a contact center architecture 200, and variations are possible with respect to the protocols, facilities, components, technologies, and equipment used.

Artificial Neural Networks

The basic structure of a neural network includes one input layer, one or more hidden layers, and one output layer. The input layer has a number of neurons (nodes) equal to the input parameters. The hidden layer(s) can have any number of nodes. The output layer has nodes equal to the number of possible classifications. The nodes making up the layers of the neural network work in a feedforward fashion and are fully connected to the nodes of the next layer in one direction. Accordingly, the input nodes of the input layer send data via synapses (weights) to the nodes of the second layer, the nodes of the second layer send data via synapse to the nodes of the next layer (e.g., another hidden layer or the outbound layer), and so forth. Therefore, an important aspect of a neural network that influences how well the network is able to perform is the architecture of the network.

The architecture of a neural network specifies what variables are involved in the network and their topological relationships. For instance, some of the variables involved in the network include the weights of the connections between the neurons (nodes) of the network, along with activities of the neurons. The architecture is typically defined by three types of parameters: the interconnection pattern between the different layers of neurons; the learning process for updating the weights of the interconnections; and the activation function that converts a neuron's weighted input to its output activation. The activation function defines the output of a neuron given an input or set of inputs. That is to say, the activation function defines the "firing rate" of the neuron. The behavior of a linear perceptron in a neural network is a network of activation functions that can be either "on" or "off." However, it is the nonlinear activation functions that allow such a network to compute nontrivial problems using only a small number of neurons (nodes).

Accordingly, the activation functions of the network may be any one of several different types depending on the embodiment. For instance, the input layer and/or hidden layer(s) of the neural network may be designed using the sigmoid activation function, which is a mathematical function having an "S" shaped curve (sigmoid curve) and is used to give logistic neurons real-valued output that is a smooth and bounded function of their total input. This function also has the added benefit of having nice derivatives that make learning the weights of a neural network easier. Accordingly, the sigmoid activation function "squashes" real numbers to a range between zero and one. In particular, large negative numbers become zero and large positive numbers become one. On the other hand, the input layer and/or the hidden layer(s) may be designed using the hyperbolic tangent (tanh) activation function, which also "squashes" real numbers, but instead of squashing them to a range between zero and one, the function squashes real numbers to a range of negative one to one and thus is centered around zero.

Other activation functions that may be considered for the input and hidden layers are the rectified linear unit (ReLU) activation function or the leaky ReLU activation function. The ReLU activation function is simply threshold at zero and therefore can be implemented by simply thresholding a matrix of activations at zero in comparison to sigmoid/tanh neurons that involve expensive operations (exponentials, etc.). However, the ReLU activation function can be prone to "die" during training. For example, a large gradient flowing through a ReLU neuron can cause the weights to update in such a way that the neuron will never activate on any data point again, causing the gradient flowing through the neuron to be zero from that point on. The leaky ReLU activation function attempts to fix this problem by having a small negative slope when the input (x) is less than zero instead of being zero.

In many instances, the softmax activation function is implemented at the output layer of a neural network used for classification purposes. This is because by assigning a softmax activation function on the output layer for categorical target variables, the outputs can be interpreted as posterior probabilities, which can be very useful in classification as it gives a certainty measure on classifications. In multi-class classification, the neural network has the same number of outputs nodes as the number of classes. Each output node belongs to some class and outputs a score for that class. For instance, using the softmax activation function on the output layer of a neural network used for predicting a cause for poor voice quality on a particular call, the neural network would have an output node for each cause that would produce a probability of that cause being the reason for the poor voice quality on the call. Here, all of the probabilities would sum to one and the cause with the highest probability is predicted to be the cause of the poor voice quality.

However, using the softmax activation function assumes that the poor voice quality is the result of only a single cause. That is to say for any one sample (e.g., for any one telephone call experiencing poor voice quality), the neural network only places the sample into a single class (e.g., identifies a single cause for the poor voice quality). This can be problematic in instances in which the poor voice quality on a call is the result of multiple causes.

Thus, a multi-label classification is used in various embodiments to combat this shortcoming. Accordingly, a multi-label classification allows for multiple causes to be identified as the reason for the poor voice quality. In other words, for any one sample (e.g., for any one telephone call experiencing poor voice quality), the neural network can place the sample into multiple classes (e.g., can identify multiple causes for the poor voice quality).

In a multi-label classification, the final score produced for each class must be independent of each other. For this reason the softmax activation function cannot be used because this function converts the score for a class into a probability, taking the other scores into consideration. Instead, the sigmoid activation function is used on the output layer of the neural network. As mentioned, the sigmoid activation function converts each score to a value between zero and one, independent of what the other scores are. If the score for a class is greater than 0.5, then the sample is classified into that class. Here, since the scores for multiple classes may be greater than 0.05, then a sample (a call experiencing poor voice quality) can be placed into multiple classes (can identify multiple causes for the poor voice quality).

As noted, the neural network is primarily made up of an input layer, an output layer, and one or more hidden layers that lie between the input and output layers. As mentioned already, the size of the input layer is typically defined by including a neuron for each input parameter. Similarly, the size of the output layer is typically defined by including a neuron for each possible output classification. However, an important decision with respect to the architecture of the neural network is the number of hidden layers to include in the network and the size of each hidden layer.

Generally speaking, as the number and size of hidden layers increases in a neural network, the capacity of the network increases. That is to say, as the number and size of hidden layers increases, the neural network is able to express more complicated functions. However, increasing the capacity of the neural network can be both beneficial and detrimental to the performance of the network. The reason for this is because the complexity of the neural network architecture can lead to overfitting the training data. Overfitting arises when the capacity of the network significantly exceeds the needed free parameters. That is to say, overfitting arises when the network fits the noise in the training data instead of the underlying relationships and as a result, fails to generalize well in unseen examples. However, with that said, the problem of overfitting the training data is normally addressed using practices such as regularization, dropout, and input noise.

Therefore, establishing the number of hidden layers and size of these layers is not typically driven by a concern for overfitting the training data. Instead, the deciding factor in determining the number of hidden layers to include in the neural network(s) and the size of these hidden layers is time and computational capabilities available in developing and testing the neural network(s). It has been found in practice that in many cases, a neural network having two hidden layers outperforms a neural network with one hidden layer. However, going beyond two hidden layers rarely helps much more.

Figure 3:
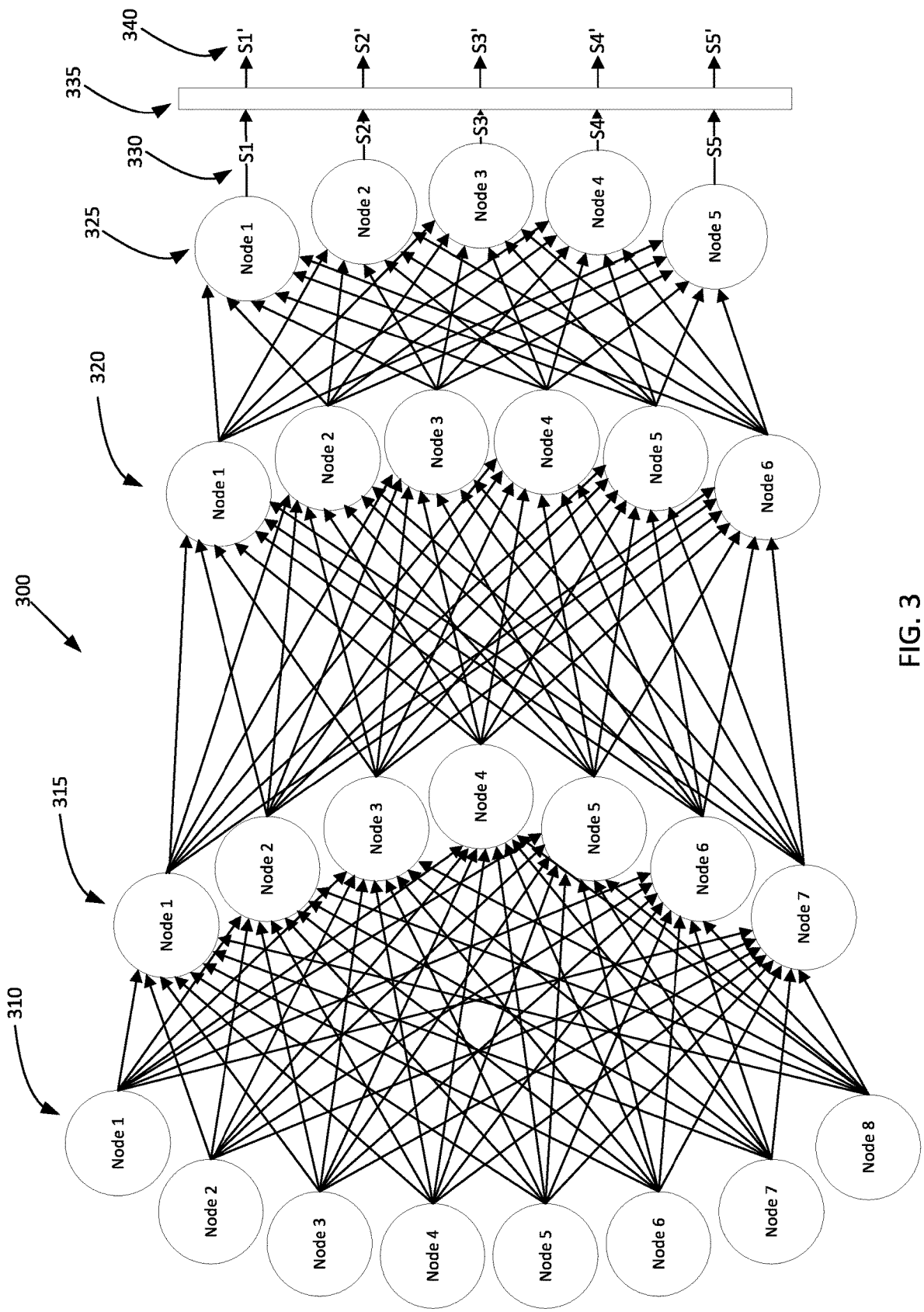
FIG. 3 illustrates a neural network architecture that may be used in accordance with various embodiments of the invention.

As for the size of a hidden layer, a general rule of thumb is to include a number of nodes that is between a proceeding layer (e.g., input layer or previous hidden layer) and a following layer (e.g., next hidden layer or output layer). For instance, in particular embodiments, the size of a hidden layer may be set to the mean of the number of nodes in a proceeding layer and a following layer. For example, the input layer for a neural network architecture being designed to predict cause(s) for poor voice quality may be defined as having eight input parameters, and thus eight nodes. Accordingly, the output layer is defined to have a number of nodes based on the number of possible causes. Therefore, if the neural network is initially designed to have two hidden layers and label a call with poor voice quality for five causes (e.g., jitter, delay, packet loss, echo, and noise), then the initial architecture for the neural network may be defined in this example as follows:

Input layer: 8 nodes
$1^{st}$ hidden layer: (8 nodes+5 nodes)/2=7 nodes
$2^{nd}$ hidden layer: (7 nodes+5 nodes)/2=6 nodes
Output layer: 5 nodes The architecture of such a neural network 300 is shown in FIG. 3. As one can see, the input layer 310 of the network has eight nodes connected to a first hidden layer 315 of seven nodes. In turn, the seven nodes in the first hidden layer 315 are connected to a second hidden layer 320 of six nodes. Finally, the six nodes in the second hidden layer 320 are connected to an output layer 325 of five nodes. Here, a sigmoid activation function 335 is applied to the score 330 produced for each output node 325 to determine a score 340 ($Si'>0.5$) indicating whether the sample falls into the particular class associated with each output node 325. Other configurations may be used and/or the architecture of the neural network 300 may be modified in various embodiment based on factors such as, for example, the modeler's experience and/or the results of testing the current architecture of the neural network 300.

An important aspect in implementing a neural network (or any other type of predictive model for that matter) is identifying the variables to use as inputs into the network. This is because the choice of input variables is a fundamental consideration in identifying the optimal functional form of the network. That is to say, the impact that the choice of input variables has on the network's performance is considerable. For instance, the selection of too few a number of variables often leads to a poorly performing model because the likelihood of having variables that are not sufficiently informative is increased, leading to some of the behavior of the output remaining unexplained by the selected input variables. However conversely, the effect of selecting too large a number of variables can also often lead to a poorly performing model because the likelihood of inclusion of redundant and irrelevant input variables is increased, leading to an overly complex model with noise.

Here, the task of selecting the input variables for the neural networks is largely dependent on discovering relationships within a number of available variables that make up the parameters associated with a call (e.g., audio and network parameters) that identify suitable predictors of the cause(s) of poor voice quality being experienced on a call. However, the difficultly in selecting appropriate input variables can arise due to the number of parameters available, which may be large, correlations between potential input variables, which recreates redundancy, and variables that have little or no predictive power.

Here, the modeler may have some expert knowledge that allows him to survey the available data and select a reasonable set of candidate input variables to begin with. That is to say, the modeler may be able to select a reasonable set of candidate input variables from the features available based on his experience with respect to what information appears to be related to the voice quality of a telephone call.

Some audio feature that may be informative of what is causing poor voice quality on a telephone call include measurements such as, for example, echo return loss, amplitude, spectral flatness, short-term energy, frequency, pitch, Mel Frequency Cepstral Coefficients, sound intensity, speech level in a frequency band, speech level averaged over a plurality of frequency bands, variation of noise level in a frequency band, speaker change rate, crosstalk, signal-to-nose ratio, dynamic range, and sample rate. With respect to network features that may be informative, such features include delay measurements such as minimum delay, maximum delay, round trip delay, and receive delay. In addition, packet measurements such as packet count, packet loss rate, duplicate packet rate, out of sequence packet rate, and discarded packet rate. Further, other network measurements may be informative such as average inter arrival jitter, jitter buffer size, and bit rate.

Once the modeler has identified a set of candidate input variables, the next step is identifying which of the candidate variables should be used as inputs to the neural network. Accordingly, several search approaches may be used in various embodiments to search through the many possible combinations of the candidate input variables to determine an optimal, or near optimal, set of input variables. One such approach involves simply evaluating all of the possible combinations of input variables and selecting the best set according to predetermined optimality criteria. However, this approach is typically only feasible when the dimensionality of the set of candidate input variables is low.

Another such approach is forward selection that involves selecting individual candidate variables one at a time. Here, a single-variable neural network is trained for each candidate variable and the input variable that maximizes model performance (e.g., model performance-based optimality criterion) is selected. Selection then continues by iteratively training a number of candidate variables minus one bivariate neural networks, in each case adding a remaining candidate to the previously selected input variable. Selection is terminated once the addition of another input variable fails to improve the performance of the model.

Yet another approach is stepwise selection, which is considered an extension of the forward selection approach, except input variables may also be removed at any subsequent iteration. The aim of this approach is to handle redundancy between candidate variables. For example, candidate variable A may be selected initially due to high relevance but is later found to be inferior to the combination of candidate variables B and C during a subsequent iteration. Accordingly, candidate variable A is now redundant and is removed in favor of the combination of candidate variables B and C.

Finally, another approach is backward elimination, which is essentially the reverse of the forward selection approach. Here, all of the candidate input variables are initially selected, and then the more unimportant variables are eliminated one-by-one. For instance, the relative importance of an input variable may be determined by removing the variable and evaluating the effect on the model retrained without the variable. While in another instance, the lesser relevant candidates are iteratively removed until some optimality criterion is met.

For instance, a backward elimination approach known as recursive feature elimination (RFE) is implemented in various embodiments to select which of the candidate input variables to use as input to the neural network. The RFE approach involves an iterative process of training a neural network, initially using all candidate input variables, and then removing one or more variables at each iteration based on the rank magnitude of the weights corresponding to each of the variables. Because a neural network can take significant time to train, in some embodiments, a faster substitute classification model such as random forests or boosting may be used with RFE to select the most useful features that will be used in the final production model. Those of ordinary skill in the art can envision other approaches that may be used in selecting which of the candidate input variables to select as inputs to the neural network in light of this disclosure.

As for training the network, the data used to train the neural network in various embodiments is split into two groups, a training set and a cross validation set. The data is made up of audio signals of telephone calls in which poor voice quality was experienced during the call and is identified with the cause(s) for the poor voice quality. Accordingly, the neural network weights are updated based on the training data, using backpropagation, and the cross validation set of data is scored after every training epoch resulting in the cross validation frame accuracy. Training is typically concluded once the accuracy increases by less than 0.5% for a second time. Accordingly, once the neural network has been trained, the network can then be used to predict the cause(s) for a party is experiencing poor voice quality on a particular telephone call.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

IVR Module

Figure 4:
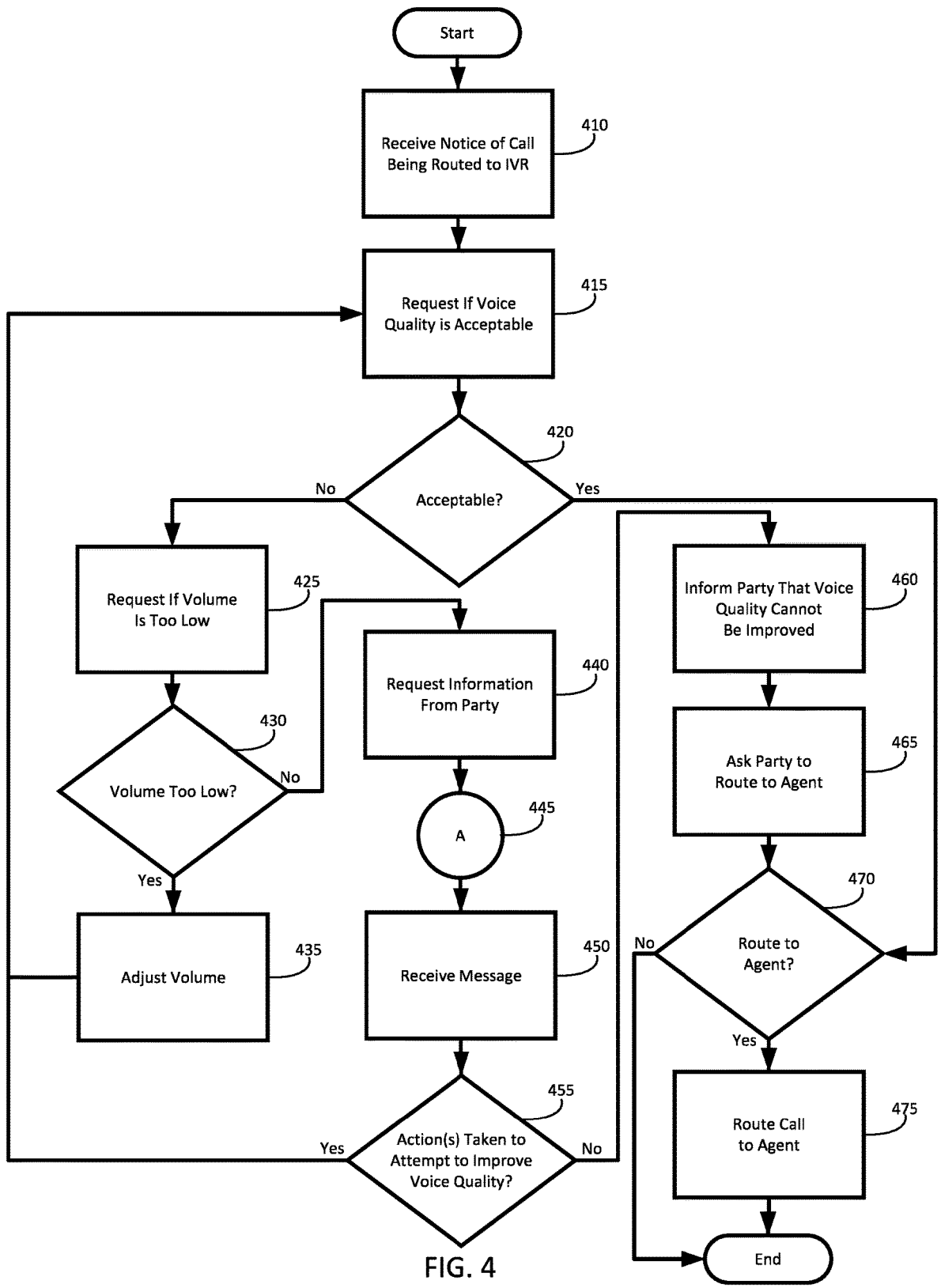
FIG. 4 is a flowchart illustrating an IVR module that can be used in accordance with various embodiments of the present invention.

Turning now to FIG. 4, additional details are provided regarding the process flow for an IVR to evaluate the voice quality a party is experiencing on a call according to various embodiments of the invention. In particular, FIG. 4 is a flow diagram showing an IVR module for performing such functionality according to various embodiments of the invention. For example, the flow diagram shown in FIG. 4 may correspond to operations carried out by one or more processors in one or more components, such as the IVR 290 described above, as it executes the IVR module stored in the component's volatile and/or nonvolatile memory.

The IVR module begins the process with receiving notice of a call being routed to the IVR in Operation 410. As previously mentioned, the UTS 260 may initially route a call to the IVR 290 so that the IVR 290 may interact with the party on the call to inquire about the voice quality the party is currently experiencing on the call. Therefore, in various embodiments, the IVR module asks the party on the call whether the voice quality is acceptable in Operation 415. Here, in particular embodiments, the IVR module may initially play the party a recording so that the party has an opportunity to evaluate the voice quality he or she is experiencing. The recording may play some voice audio and conclude with asking the party if the party can hear and understand the audio at an acceptable level.

Accordingly, the IVR module then determines whether the voice quality being experienced by the party on the call is acceptable in Operation 420. If the voice quality is acceptable, then the IVR module may gather further information from the party such as, for example, the reason for the call and/or account information that may be useful in handling the call. The IVR module may then determine whether the call should be routed to an agent to handle in Operation 470. If so, then the call is routed to an appropriate agent in Operation 475. This particular operation may involve informing the host server 210 that the call is to be routed to an agent. In turn, the host server 210 may determine which agent should receive the call and have the call routed accordingly.

However, if the party indicates the voice quality is not acceptable, then the NR module in various embodiments asks the party whether the volume is too low in Operation 425. Here, the voice quality issue may simply be that party is having a difficult time hearing the audio being played by the IVR because the volume is set too low. Therefore, a quick fix to the poor voice quality may be simply to increase the volume on the call. Thus, the IVR module determines whether the volume is too low for the party in Operation 430 and if so, the IVR module adjusts the volume in Operation 435. At this point, the IVR module returns to Operation 415 and asks the party again if the voice quality is now acceptable.

If the volume is not too low, then the IVR module requests information from the party in Operation 440. Generally speaking, the IVR module asks for information that may be beneficial in identifying the cause(s) for the poor voice quality the party is experience on the call. For instance, the IVR module may inquire as to the party's service provider and whether the party is using a mobile device or a landline phone. Such information may be provided as further input into the predictive model(s) to attempt to identify the cause(s) for the poor voice quality the party is experiencing on the call. In addition, the IVR module may gather information from the party that is considered more subjective with respect to the party's perception of the voice quality he or she is experiencing on the call (the party's opinion). For instance, the IVR module may inquire as to the party's view (interpretation) as to why he or she believes the voice quality is poor. Here, the IVR module may provide suggestions as to the cause of the poor voice quality. For example, the IVR module may ask the party whether the audio sounds choppy or are periods occurring in which the audio drops out in the call. Such information may be provided as further input into the predictive model(s) to help account for the party's bias in evaluating the voice quality of the call.

At this point, the IVR module attempts to remedy the poor voice quality in Operation 445. In particular embodiments, the IVR module performs this operation by invoking a voice quality module. As is discussed in further detail herein, the voice quality module identifies one or more causes for the poor voice quality, determines whether one or more actions can be taken to attempt to improve the voice quality on the call based on the identified cause(s), and if so, take such actions accordingly. Once the voice quality module has attempted to improve the voice quality, the voice quality module returns a message to the IVR module informing the IVR module whether or not action(s) have been taken to attempt to improve the voice quality.

In turn, the IVR module receives the message in Operation 450 and determines from the message whether any actions have been taken in Operation 455. If so, then the IVR module returns to Operation 415 and asks the party again whether the voice quality the party is now experiencing on the call is acceptable. At this point, the IVR module repeats the operations previously discussed until the voice quality is acceptable or until no further actions can be made to attempt to improve the voice quality. However, if the message received from the voice quality module indicates no actions were taken to attempt to improve the voice quality in Operation 455, then the IVR module informs the party in Operation 460 that the voice quality cannot be (further) improved.

For example, the voice quality module may have initially identified the cause of the poor voice quality is the call is experiencing a high level of packet loss with respect to the packets traveling to the party over the network. Here, the voice quality module may have initially set the Quality of Service (QoS) for the packets to provide them with higher priority over the VoIP network to minimize delay and potential loss. However, this particular adjustment may not have remedied the problem and the voice quality module may again determine the cause of the continued poor voice quality on the call is a high level of packet loss. This time, the voice quality module may institute silence suppression to reduce the number of packets that have to travel to the party, again hoping to minimize delay and potential loss. However, the voice quality may still not be acceptable. At this point, the voice quality module may determine the continued cause of the poor voice quality is due to high packet loss. However, no other actions are available to attempt to remedy the problem. Therefore, the voice quality cannot be (further) improved.

While in another example, the voice quality module may determine the cause of the poor voice quality is related to something beyond the contact center's control (e.g., such as something within the contact center's telco provider's network or the party's service provider's network). Therefore, no actions within the contact center's control that can be taken to attempt to address the poor voice quality. Here, the IVR module may inform the party on the call that the cause of the poor voice quality appears to be an issue within a service provider's network and cannot be addressed by the contact center. The IVR module may further suggest that the party hang up and try the call at a later time when the network issue may have resolved. In addition, the IVR module may provide the party with information (a code) that provides the party with priority when the party calls back into the contact center at a later time.

If the voice quality cannot be improved, then the IVR module in particular embodiments may ask the party whether he or she would still like to continue the call and be routed to an agent in Operation 465. Although the voice quality may not be optimal (and may not necessarily be acceptable), the party may still want to talk with an agent at the contact center. That is to say, the party may be willing to "put up" with the poor voice quality. Therefore, the IVR module determines whether to route the call to an agent in Operation 470. If so, then the call is routed to appropriate agent in Operation 475. If not, the process is ended (e.g., and the call is ended).

Voice Quality Module

Figure 5:
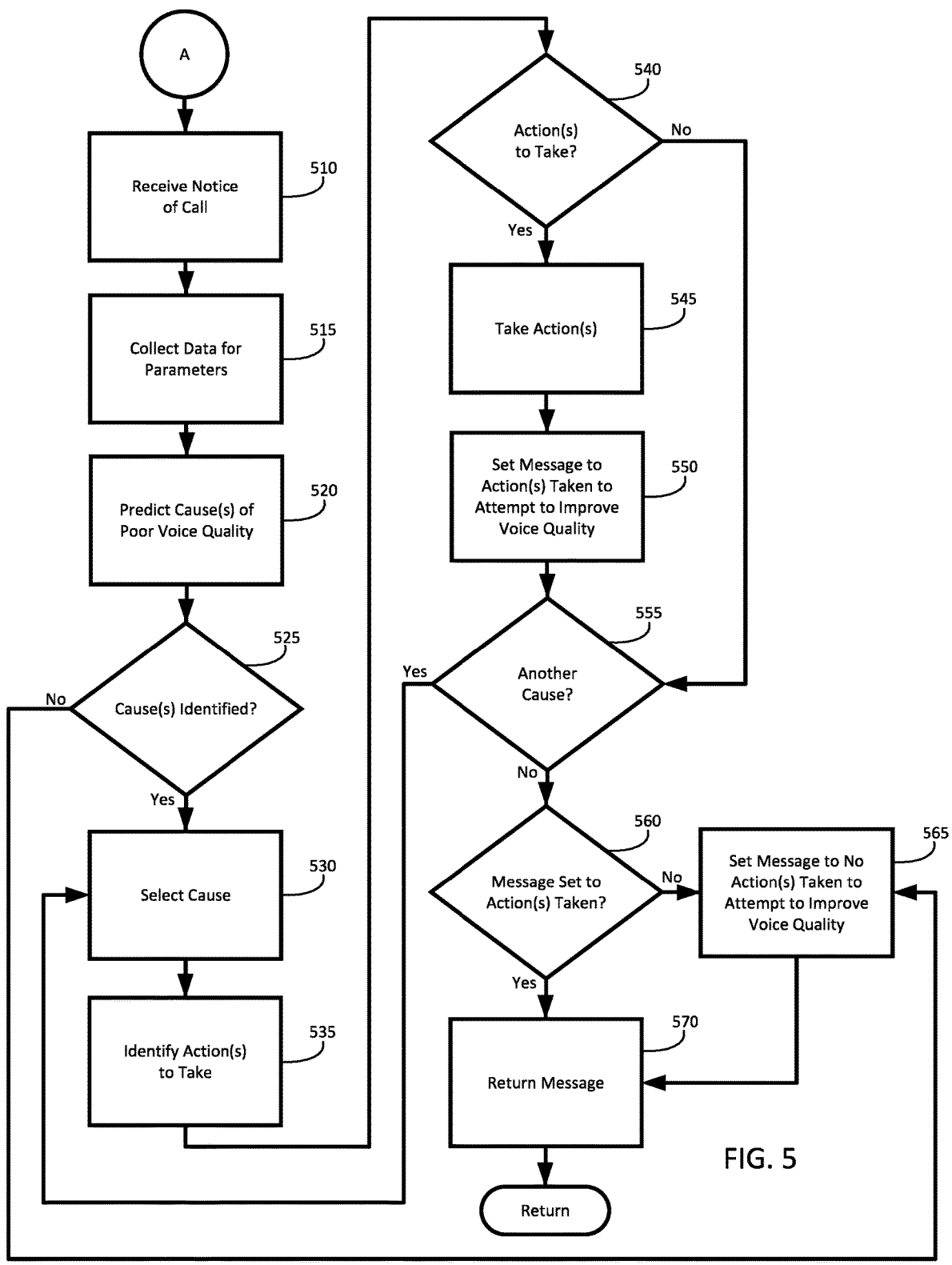
FIG. 5 is a flowchart illustrating a voice quality module that can be used in accordance with various embodiments of the present invention.

Turning now to FIG. 5, additional details are provided regarding the process flow for attempting to improve the voice quality on a call according to various embodiments of the invention. In particular, FIG. 5 is a flow diagram showing a voice quality module for performing such functionality according to various embodiments of the invention. For example, the flow diagram shown in FIG. 5 may correspond to operations carried out by one or more processors in one or more components, such as the UTS 260 or the IVR 290 described above, as it executes the voice quality module stored in the component's volatile and/or nonvolatile memory.

As already mentioned, the voice quality module may be invoked by the IVR module in various embodiments upon the IVR module determining a party on a call is experiencing poor voice quality. However, in other embodiments, the voice quality module may be invoked by a different module or may be a stand-alone module that independently executes to attempt to improve the voice quality on a call.

For instance, in particular embodiments, a call may be routed to an agent instead of an IVR 290 initially. Here, the agent may engage with the party on the call about the voice quality he or she is experiencing on the call. If the quality is unacceptable, then the agent may gather information from the party and invoke the voice quality module in attempt to improve the voice quality. Furthermore, the agent may also invoke the voice quality module in particular instances when he or she is experiencing poor voice quality on the call.

Accordingly, the process begins with the voice quality module receiving notice of the call in Operation 510. Here, in particular embodiments, a module such as the IVR module may invoke the voice quality module and inform the voice quality module of a call experiencing poor voice quality. In addition, the voice quality module may be provided with information gathered from the party on the call such as whether the party is on a wireless device or a landline phone and/or the name of the party's service provider, as well as information on the party's subjective assessment (opinion) of the voice quality.

At this point, the voice quality module collects data (e.g., measurements) for one or more parameters associated with the phone call in Operation 515. As already discussed, these parameters may include one or more parameters associated with the network(s) over which the audio traffic travels for the call such as, for example, delay variables and data packet variables. Here, the networks may include the contact center's internal network, as well as contact center's telco provider's and/or party's service provider's networks. In addition, the parameters may include one or more parameters associated with the audio of the phone call such as, for example, signal-to-noise ratio, amplitude, frequency, and pitch. Depending on the embodiments, the data for these parameters may be provided by various components within the contact center architecture 200 that collect and record the data for the call. For example, a component may monitor the audio channels for the call with respect to noisy line detection.

Once the data for the parameters have been collected, the voice quality module predicts the cause(s) of the poor voice quality in Operation 520. As previously discussed, the voice quality module performs this operation in various embodiments by making use of one or more predictive models. Accordingly, the predictive model(s) provide a prediction as to the cause(s) of the poor voice quality such as, for instance, too high packet delay and/or packet loss, high level of noise, network congestion, and/or high echo.

At this point, the voice quality module determines whether any cause(s) for the poor voice quality have been identified in Operation 525. If not, then the voice quality module sets a message indicating no action(s) were taken to attempt to improve the voice quality in Operation 565 and returns the message in Operation 570. However, if at least one cause for the poor voice quality has been identified, then the voice quality module selects one of the causes in Operation 530.

The voice quality module then tries to identify one or more actions that can be taken to attempt to remedy the cause of the poor voice quality in Operation 535. In particular embodiments, the contact center may have constructed a process flow that identifies a course of actions to take with respect to the call to attempt to correct the poor voice quality based on the identified cause.

For example, the voice quality module may identify the cause of the poor voice quality is the party on the call is receiving a high level of echo. Here, the process flow may indicate adjusting an echo suppressor being applied on the audio channel for the party to attempt to eliminate the echo from reaching the party. An echo suppressor cancels echo by detecting a voice signal going in one direction and a circuit, and then inserting loss in the other direction. In this instance, the echo suppressor would detect the party's voice on the audio channel leading to the IVR (or agent) and insert loss for the party's voice on the audio channel leading to the party.

While in another example, the voice quality module may identify the cause of the poor voice quality is noise the party is receiving on the call. Here, the process flow may indicate to initially apply noise reduction to attempt to reduce the hiss noise (white noise) caused by electronics and coding/encoding and background noise. Generally speaking, some type of digital processing technique is used to remove unwanted noise while leaving the important speech signal intact. However, such techniques typically require a great deal of processing power. Therefore, the process flow may indicate to initially apply a static noise reduction algorithm to the audio signal to see if the voice quality can be improved to an acceptable level. If the voice quality is still not acceptable after applying the static noise reduction algorithm, then the process flow may indicate to apply a dynamic noise reduction algorithm to the audio signal. If the voice quality is still not acceptable, then the process flow may indicate to apply noise gating to the audio signal. Noise gating involves attenuating the signal when no speech is detected to prevent any unnecessary noise from being inserted. This may conclude all the corrective actions provided by the process flow for addressing noise. Therefore, if after taking these three corrective actions the voice quality is still not acceptable and the cause is still determined to be noise, then no further corrections can be taken to attempt to improve the voice quality on the call.

Therefore, returning to FIG. 5, the voice quality module determines whether any action(s) can be taken to attempt to improve/correct the poor voice quality in Operation 540. If not, then the voice quality module may determine whether another cause has been identified for the poor voice quality in Operation 555. If another cause has been identified, then the voice quality module returns to Operation 530, selects the next cause, and repeats the operations already discussed for the newly selected cause.

However, if one or more actions can be taken to attempt to address the cause of the poor voice quality, then the voice quality module has the actions performed in Operation 545. At this point, the voice quality module sets the message to indicate action(s) have been taken to attempt to improve the voice quality in Operation 550. The voice quality module then determines whether another cause has been identified for poor voice quality in Operation 555.

Once the voice quality module has processed all of the identified causes for the poor voice quality, the voice quality module determines whether the message has been set indicating actions have been taken in Operation 560. If not, then the voice quality module sets the message to indicate no action(s) were taken to attempt to improve the voice quality in Operation 565. Finally, the voice quality module returns to the message in Operation 570. For instance, in particular embodiments, the voice quality module returns the message to the IVR module or to the agent handling the call.

Exemplary Processing Device Architecture

Figure 6:
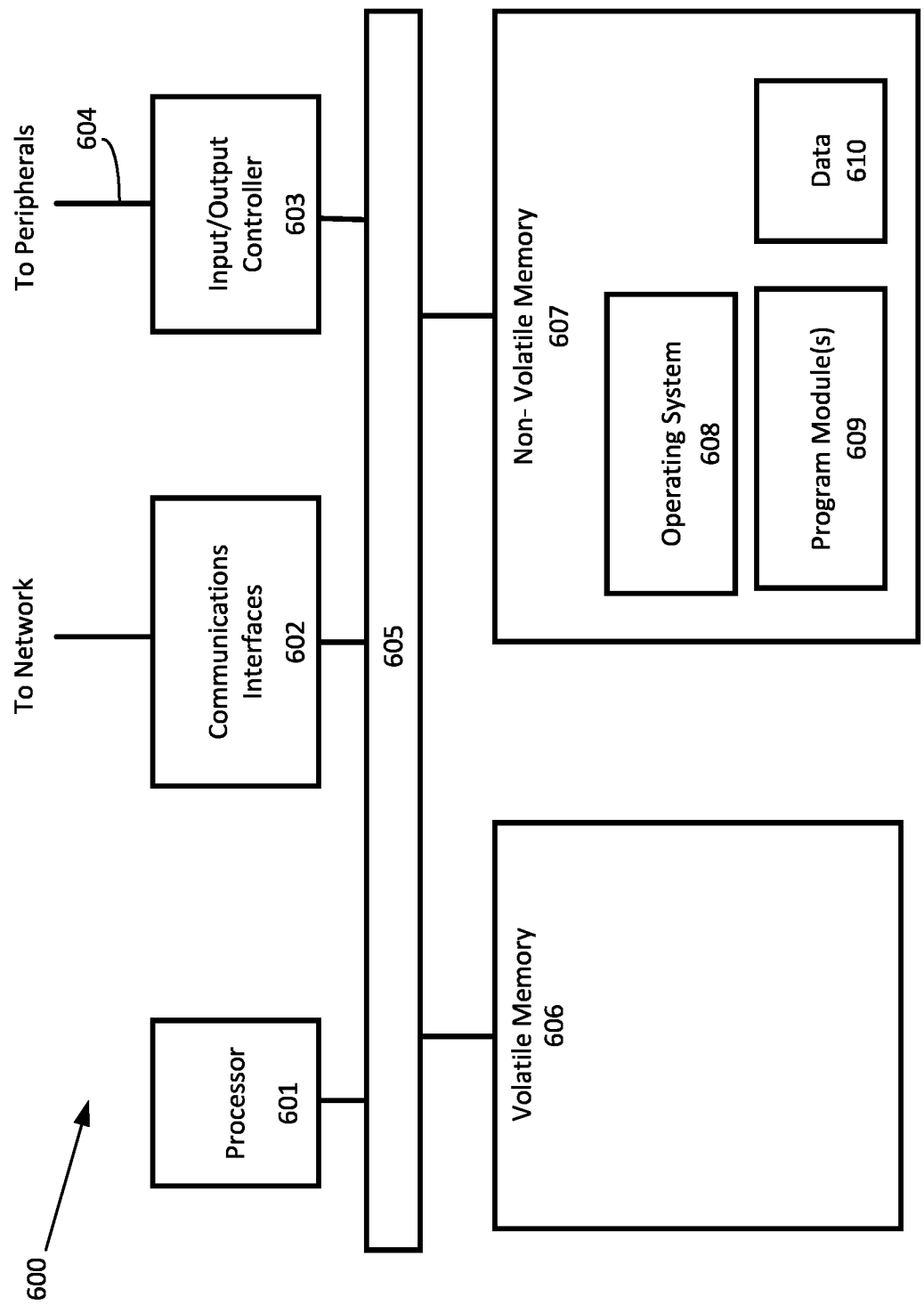
FIG. 6 is an exemplary schematic diagram of a server used in one embodiment of the contact center architecture to practice the technologies disclosed herein.

As discussed in conjunction with FIG. 2, the contact center architecture 200 may comprise various components that comprise a processing system. FIG. 6 is an exemplary schematic diagram of a processing component 600 that may be used in an embodiment of the contact center architecture 200 to practice the technologies disclosed herein such as, for example, the host server 210, web server 235, UTS 260, PBXs 265, 270, 275, IVR 290, or other components previously described. In general, the term "processing component" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 6, the processing component 600 may include one or more processors 601 that may communicate with other elements within the processing component 600 via a bus 605. The processor 601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 600 may also include one or more communication interfaces 602 for communicating data via the local network with various external devices, such as other components of FIG. 2. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 603 may also communicate with one or more input devices or peripherals using an interface 604, such as, but not limited to: a keyboard, a mouse, a touch screen/display input, microphone, pointing device, etc. The input/output controller 603 may also communicate with output devices or peripherals, such as displays, printers, speakers, headsets, banner displays, etc.

The processor 601 may be configured to execute instructions stored in volatile memory 606, non-volatile memory 607, or other forms of computer-readable storage media accessible to the processor 601. The volatile memory 606 may comprise various types of memory technologies, including, but not limited to: random access memory ("RAM"), dynamic random-access memory ("DRAM"), static random-access memory ("SRAM"), and other forms well known to those skilled in the art. The non-volatile memory 607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 607 may store program code and data, which also may be loaded into the volatile memory 606 at execution time. Specifically, the non-volatile memory 607 may store one or more program modules 609, such as the IVR module and/or voice quality module described above containing instructions for performing the processes and/or functions associated with the technologies disclosed herein, and/or operating system code 608. In addition, these program modules 609 may also access, generate, or store data 610, in the non-volatile memory 607, as well as in the volatile memory 606. The volatile memory 606 and/or non-volatile memory 607 may be used to store other information including, but not limited to: records, applications, programs, scripts, source code, object code, byte code, compiled code, interpreted code, machine code, executable instructions, or the like. These may be executed or processed by, for example, the processor 601 and/or may form a part of, or may interact with, the program modules 609.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for handling voice quality being experienced as poor by a remote party on a call, the method comprising:
   receiving an assessment from the remote party at an interactive voice response system (IVR) on the voice quality of the call; and
   in response to the assessment indicating the remote party is experiencing the voice quality as poor:
      collecting data for one or more parameters associated with at least one of audio of the call and a network used to carry the audio of the call in which the one or more parameters affect the voice quality of the call;
      predicting at least one cause for the voice quality being poor by at least one computer processor using a predictive model in which the data for the one or more parameters is provided as input to the predictive model; and
      having one or more actions taken to attempt to address the at least one cause and improve the voice quality of the call for the remote party.

2. The method of claim 1, wherein the predictive model comprises a neural network.

3. The method of claim 1 further comprising having the IVR communicate to the remote party that the one or more actions have been taken to attempt to address the at least one cause once the one or more actions have been taken.

4. The method of claim 1 further comprising, once the one or more actions have been taken:
receiving a second assessment from the remote party at the IVR on the voice quality of the call; and
in response to the second assessment indicating the remote party is continuing to experience the voice quality as poor:
collecting new data for the one or more parameters;
predicting at least one second cause for the voice quality being poor by the at least one computer processor using the predictive model in which the new data for the one or more parameters is provided as input to the predictive model; and
upon determining no actions can be taken to attempt to address the second cause, having the IVR communicate to the remote party that no action can be taken to attempt to improve the voice quality of the call.

5. The method of claim 4 further comprising providing the remote party with information that the remote party can use to gain priority on a subsequent call over at least one other call.

6. The method of claim 1 further comprising:
receiving information at the IVR from the remote party on an opinion of the voice quality of the call; and
providing the information on the opinion as further input to the predictive model.

7. A non-transitory, computer-readable medium comprising computer-executable instructions for handling voice quality being experienced as poor by a remote party on a call, that when executed, cause at least one computer processor to, in response to receiving an assessment at an interactive voice response system (IVR) indicating the remote party is experiencing the voice quality as poor on the call:
collect data for one or more parameters associated with at least one of audio of the call and a network used to carry the audio of the call in which the one or more parameters affect the voice quality of the call;
predict at least one cause for the voice quality being poor by using a predictive model in which the data for the one or more parameters is provided as input to the predictive model; and
have one or more actions taken to attempt to address the at least one cause and improve the voice quality on the call for the remote party.

8. The non-transitory, computer-readable medium of claim 7, wherein the predictive model comprises a neural network.

9. The non-transitory, computer-readable medium of claim 7, wherein the computer-executable instructions are further configured to cause the at least one computer processor to:
have the IVR communicate to the remote party that the one or more actions have been taken to attempt to address the at least one cause once the one or more actions have been taken.

10. The non-transitory, computer-readable medium of claim 7, wherein the computer-executable instructions are further configured to cause the at least one computer processor to, once the one or more actions have been taken and in response to a second assessment indicating the remote party is continuing to experience the voice quality as poor:
collect new data for the one or more parameters;
predict at least one second cause for the voice quality being poor by using the predictive model in which the new data for the one or more parameters is provided as input to the predictive model; and
upon determining no actions can be taken to attempt to address the second cause, have the IVR communicate to the remote party that no action can be taken to attempt to improve the voice quality on the call.

11. The non-transitory, computer-readable medium of claim 10, wherein the computer-executable instructions are further configured to cause the at least one computer processor to:
have information provided to the remote party that the remote party can use to gain priority on a subsequent call over at least one other call.

12. The non-transitory, computer-readable medium of claim 7, wherein the computer-executable instructions are further configured to cause the at least one computer processor to:
provide information obtained by the IVR from the remote party on an opinion of the voice quality of the call as further input to the predictive model.

13. A system for handling voice quality being experienced as poor by a remote party on a call, the system comprising:
an interactive voice response component (IVR) configured to receive an assessment from the remote party on the voice quality of the call; and
at least one computer processor configured to, in response to the assessment indicating the remote party is experiencing the voice quality as poor:
collect data for one or more parameters associated with at least one of audio of the call and a network used to carry the audio of the call in which the one or more parameters affect the voice quality of the call;
predict at least one cause for the voice quality being poor by using a predictive model in which the data for the one or more parameters is provided as input to the predictive model; and
have one or more actions taken to attempt to address the at least one cause and improve the voice quality on the call for the remote party.

14. The system of claim 13, wherein the predictive model comprises a neural network.

15. The system of claim 13, wherein the IVR is further configured to communicate to the remote party that the one or more actions have been taken to attempt to address the at least one cause once the one or more actions have been taken.

16. The system of claim 13, wherein once the one or more actions have been taken:
the IVR is further configured to receive a second assessment from the remote party on the voice quality of the call; and
in response to the second assessment indicating the remote party is continuing to experience the voice quality as poor, the at least one computer processor is further configured to:
collect new data for the one or more parameters;
predict at least one second cause for the voice quality being poor by using the predictive model in which the new data for the one or more parameters is provided as input to the predictive model; and
upon determining no actions can be taken to attempt to address the second cause, have the IVR communicate to the remote party that no action can be taken to attempt to improve the voice quality on the call.

17. The system of claim 16, wherein the IVR is further configured to provide the remote party with information that the remote party can use to gain priority on a subsequent call over at least one other call.

18. The system of claim 13, wherein:
the IVR is further configured to receive information from the remote party on an opinion of the voice quality of the call; and
the at least one computer processor is further configured to provide the information on the opinion as further input to the predictive model.

* * * * *